US012162281B2

(12) United States Patent
Yoshida

(10) Patent No.: US 12,162,281 B2
(45) Date of Patent: Dec. 10, 2024

(54) LIQUID DISCHARGE APPARATUS, DRIVE WAVEFORM GENERATOR, AND HEAD DRIVING METHOD

(71) Applicant: Takahiro Yoshida, Kanagawa (JP)

(72) Inventor: Takahiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 17/930,106

(22) Filed: Sep. 7, 2022

(65) Prior Publication Data

US 2023/0098478 A1 Mar. 30, 2023

(30) Foreign Application Priority Data

Sep. 27, 2021 (JP) ................................. 2021-157303

(51) Int. Cl.
*B41J 29/38* (2006.01)
*B41J 2/045* (2006.01)

(52) U.S. Cl.
CPC ....... *B41J 2/04588* (2013.01); *B41J 2/04573* (2013.01)

(58) Field of Classification Search
CPC ................ B41J 2/04588; B41J 2/04573; B41J 2/0459
See application file for complete search history.

(56) References Cited

U.S. PATENT DOCUMENTS

| | | | | |
|---|---|---|---|---|
| 8,657,400 | B2 * | 2/2014 | Ozawa | B41J 2/0459 347/11 |
| 2007/0080978 | A1 | 4/2007 | Yoshida | |
| 2007/0211092 | A1 | 9/2007 | Shingyohuchi et al. | |
| 2009/0147034 | A1 | 6/2009 | Yoshida | |
| 2009/0289975 | A1 | 11/2009 | Yoshida | |
| 2014/0218428 | A1 | 8/2014 | Araki et al. | |
| 2014/0285554 | A1 | 9/2014 | Yanaka et al. | |
| 2015/0375504 | A1 | 12/2015 | Kitaoka et al. | |
| 2018/0178538 | A1 | 6/2018 | Miyazawa et al. | |
| 2019/0283414 | A1 | 9/2019 | Yoshida | |
| 2021/0001629 | A1 | 1/2021 | Yoshida | |
| 2022/0169020 | A1 | 6/2022 | Yoshida | |

FOREIGN PATENT DOCUMENTS

| | | |
|---|---|---|
| JP | 2020-023058 | 2/2020 |
| JP | 2021-011108 | 2/2021 |

* cited by examiner

*Primary Examiner* — Lam S Nguyen
(74) *Attorney, Agent, or Firm* — IPUSA, PLLC

(57) ABSTRACT

A liquid discharge apparatus includes: a liquid discharge head configured to discharge a liquid from a nozzle; a drive waveform generator configured to generate a drive waveform including multiple drive pulses to be applied to the liquid discharge head, the multiple drive pulses successively including: a first drive pulse configured to cause the liquid discharge head to discharge the liquid; a second drive pulse configured to cause the liquid discharge head not to discharged the liquid while causing meniscus of the liquid in the nozzle in the liquid discharge head to vibrate; and a third drive pulse configured to cause the liquid discharge head to discharge the liquid; in time series.

11 Claims, 10 Drawing Sheets

LIQUID DISCHARGE APPARATUS, DRIVE WAVEFORM GENERATOR, AND HEAD DRIVING METHOD

CROSS-REFERENCE TO RELATED APPLICATIONS

This patent application is based on and claims priority pursuant to 35 U.S.C. § 119(a) to Japanese Patent Application No. 2021-157303, filed on Sep. 27, 2021, in the Japan Patent Office, the entire disclosure of which is hereby incorporated by reference herein.

BACKGROUND

Technical Field

Embodiments of this disclosure relate to a liquid discharge apparatus, a drive waveform generator, and a head driving method.

Related Art

When liquid is discharged from a liquid discharge head, a satellite droplet due to thread breakup that occurs in association with discharge of a main droplet is expected to be reduced.

A drive waveform successively includes a non-discharge pulse and a discharge pulse in time series and has a time interval Td between the non-discharge pulse and the discharge pulse. The non-discharge pulse causes liquid not to be discharged, and has a wave height value Vp1. The discharge pulse causes liquid to be discharged. Such a time interval Td is set within a range of Tc−0.2Tc to Tc+0.45Tc, where Tc is a natural vibration period. The wave height value Vp1 of the non-discharge pulse is set within a range of −10% to +10% of a wave height value Vpp1 that is provided when a droplet speed of liquid to be discharged in response to the discharge pulse is a minimal value.

SUMMARY

A liquid discharge apparatus includes: a liquid discharge head configured to discharge a liquid from a nozzle; a drive waveform generator configured to generate a drive waveform including multiple drive pulses to be applied to the liquid discharge head, the multiple drive pulses successively including: a first drive pulse configured to cause the liquid discharge head to discharge the liquid; a second drive pulse configured to cause the liquid discharge head not to discharged the liquid while causing meniscus of the liquid in the nozzle in the liquid discharge head to vibrate; and a third drive pulse configured to cause the liquid discharge head to discharge the liquid; in time series. The drive waveform has: a first interval between the first drive pulse and the second drive pulse at which the second drive pulse resonate with the first drive pulse; and a second interval between the second drive pulse and the third drive pulse at which the third drive pulse resonate with the second drive pulse.

A waveform generator generates a drive waveform including a plurality of drive pulses to be applied to a liquid discharge head. The drive waveform successively includes a first drive pulse, a second drive pulse, and a third drive pulse that are described above.

A head driving method includes generating a drive waveform including a plurality of drive pulses to be applied to a liquid discharge head, and applying the drive waveform to the liquid discharged head to discharge liquid. The drive waveform successively includes a first drive pulse, a second drive pulse, and a third drive pulse that are described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
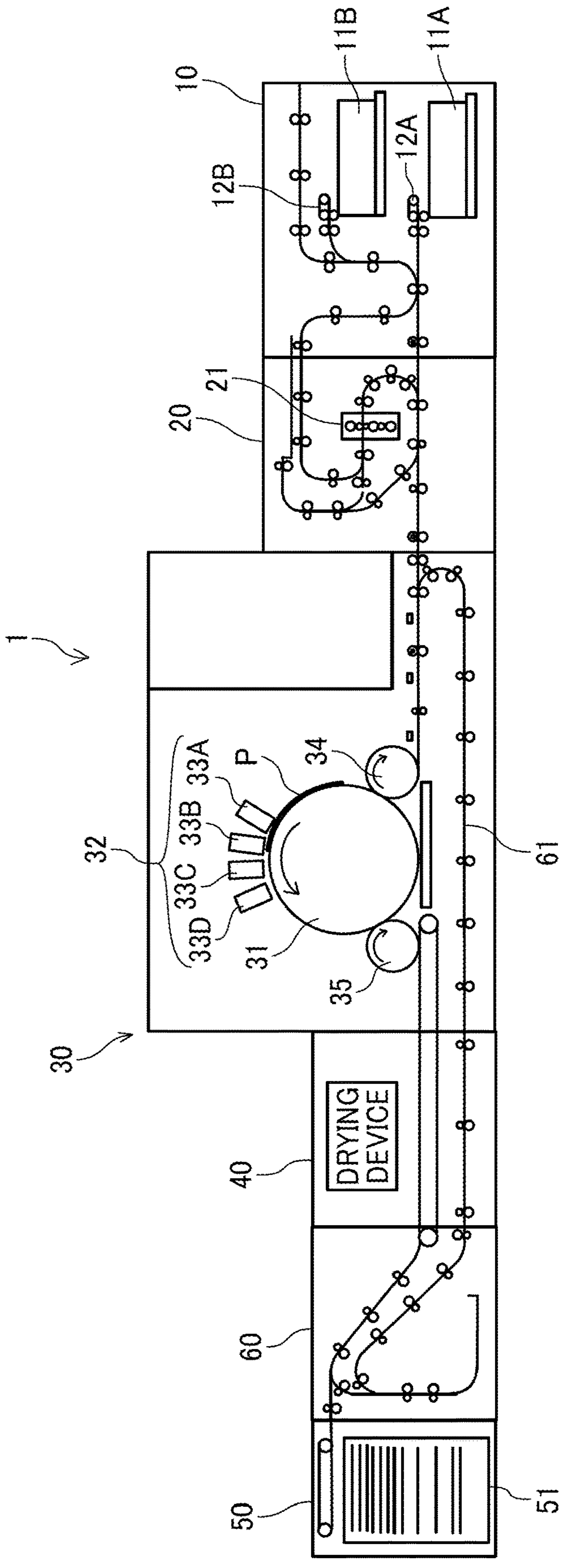
FIG. 1 is a schematic diagram illustrating a printing apparatus as a liquid discharge apparatus according to one embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Figure 2:
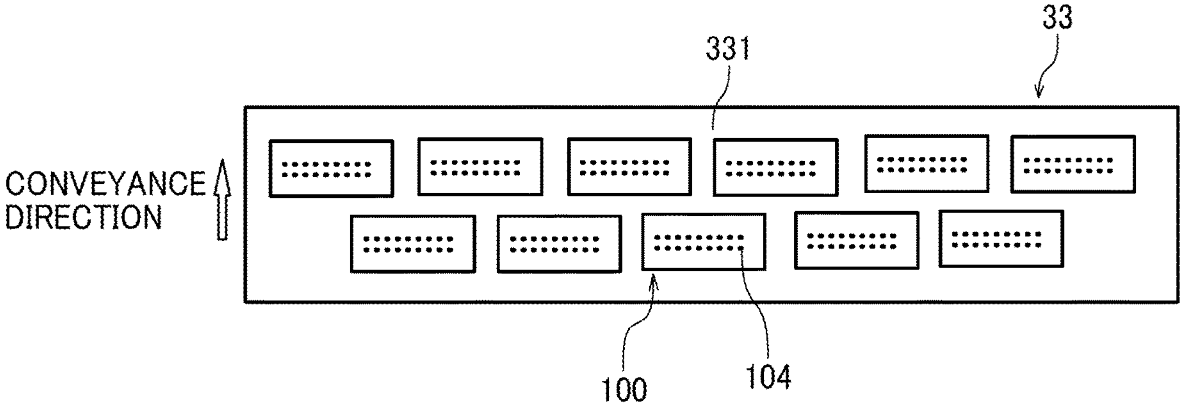
FIG. 2 is a plan view illustrating a discharge unit of the printing apparatus.

Hereinafter, embodiments are described with reference to the drawings. A printing apparatus 1 as a liquid discharge apparatus according to one embodiment is described with reference to FIGS. 1 and 2. FIG. 1 is a schematic diagram of the printing apparatus 1, and FIG. 2 is a plan view of a discharge unit 33 of the printing apparatus 1.

The printing apparatus 1 is a liquid discharge apparatus, and includes a loading device 10 into which a sheet P is loaded, a pretreatment device 20, a printing device 30, a drying device 40, and an ejection device 50. In the printing apparatus 1, the pretreatment device 20 as a pretreatment unit adds (applies) pretreatment liquid, as necessary, to a sheet P to be conveyed (supplied) from the loading device 10, and the printing device 30 adds to the sheet P to perform desired printing. The drying device 40 dries the liquid adhering to the sheet P, and then the sheet P is ejected to the ejection device 50.

The loading device 10 includes loading trays 11 (a lower loading tray 11A and an upper loading tray 11B) that accommodate a plurality of sheets P, and feeders 12 (12A and 12B) that separate and feed the sheets P one by one from the respective loading trays 11. The loading device 10 supplies the sheet P to the pretreatment device 20.

The pretreatment device 20 includes a coating unit 21 as a treatment liquid application unit that coats a printing surface of the sheet P with a treatment liquid. The treatment liquid has, for example, an effect of aggregation of ink particles to prevent bleed-through.

The printing device 30 includes a drum 31 and a liquid discharge device 32. The drum 31 is a bearer (a rotator) that rotates with a circumferential surface of the drum 31 bearing the sheet P. The liquid discharge device 32 discharges liquid toward the sheet P on the drum 31.

In addition, the printing device 30 includes transfer cylinders 34 and 35. The transfer cylinder 34 receives the sheet P fed from the pretreatment device 20 and forwards the received sheet P to the drum 31. The transfer cylinder 35 receives the sheet P conveyed by the drum 31 and forwards the received sheet P to the drying device 40.

The transfer cylinder 34 includes a gripper (a sheet gripper) that grips a leading end of the sheet P conveyed from the pretreatment device 20 to the printing device 30. With rotation of the transfer cylinder 34, the sheet P is conveyed with the leading end gripped by the sheet gripper of the transfer cylinder 34. The sheet P conveyed by the transfer cylinder 34 is forwarded to the drum 31 at a position opposite the drum 31.

Similarly, the drum 31 includes a gripper (a sheet gripper) on a surface of the drum 31, and the leading end of the sheet P is gripped by the sheet gripper of the drum 31. The drum 31 has a plurality of suction holes that are dispersedly formed on the surface of the drum 31, and a suction unit generates suction airflow directed from a desired suction hole of the drum 31 to an inner side of the drum 31.

The sheet gripper of the drum 31 grips the leading end of the sheet P forwarded from the transfer cylinder 34 to the drum 31, and the sheet P is attracted to and borne on the drum 31 by the suction airflow provided by the suction unit. Thus, the sheet P is conveyed with rotation of the drum 31.

The liquid discharge device 32 includes discharge units 33 (33A to 33D) as liquid dischargers. For example, the discharge units 33A, 33B, 33C, and 33D discharge liquid of cyan (C), magenta (M), yellow (Y), and black (K), respectively. Moreover, a discharge unit that discharges a special liquid such as liquid of white, gold, and silver may be employed.

For example, the discharge unit 33 as illustrated in FIG. 2 is a full line head including a plurality of liquid discharge heads (hereinafter, also simply referred to as heads) 100 that are arranged in a staggered pattern on a base 331. Each of the plurality of liquid discharge heads 100 includes a plurality of nozzle rows, and a plurality of nozzles 104 is arranged in each nozzle row.

A discharge operation of each of the discharge units 33 of the liquid discharge device 32 is controlled based on a drive signal corresponding to print data. When the sheet P borne on the drum 31 passes an area opposite the liquid discharge device 32, the discharge units 33 discharge liquid of the respective colors, and an image corresponding to the print data is printed on the sheet P.

The drying device 40 dries the liquid which has adhered to the sheet P by the printing device 30. Thus, a liquid component such as moisture in the liquid evaporates, and a colorant contained in the liquid is fixed on the sheet P. In addition, curling of the sheet P is eliminated or reduced.

When duplex printing is performed on the sheet P which has passed through the drying device 40, a reverse device 60 reverses the sheet P in a switchback manner, and the reversed sheet P is fed back to the upstream side of the transfer cylinder 34 via a conveyance path 61 of the printing device 30.

The ejection device 50 includes an ejection tray 51 on which a plurality of sheets P is to be stacked. The sheets P conveyed from the drying device 40 via the reverse device 60 are sequentially stacked and held on the ejection tray 51.

Figure 3:
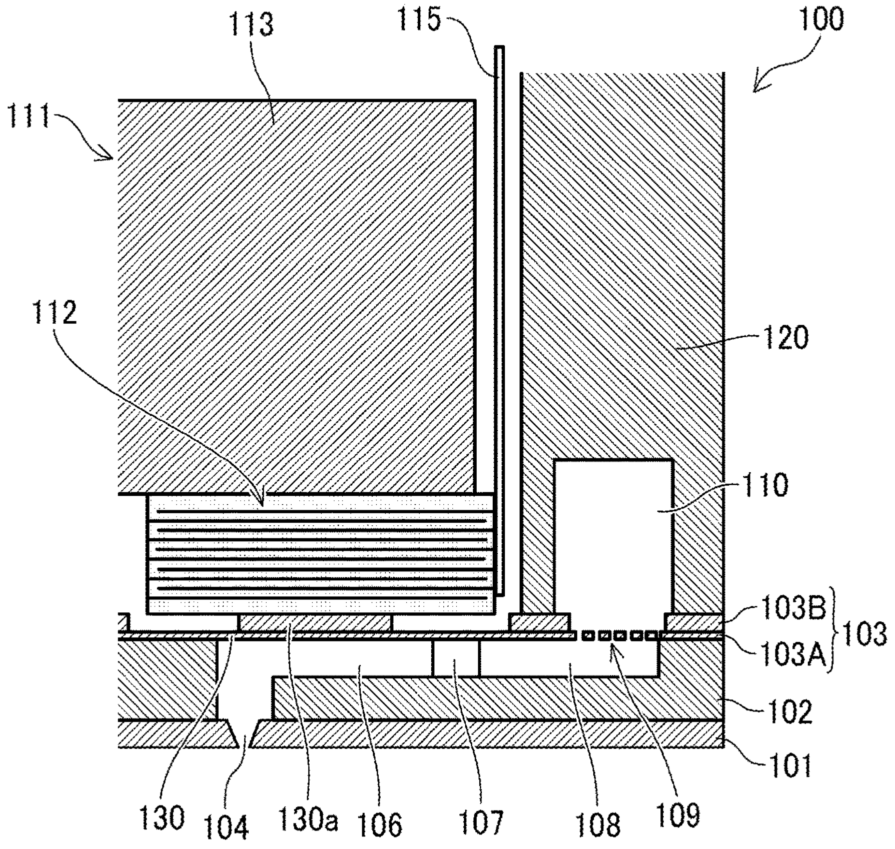
FIG. 3 is a cross-sectional view illustrating one example of a head in a direction perpendicular to a nozzle arrangement direction.
Figure 4:
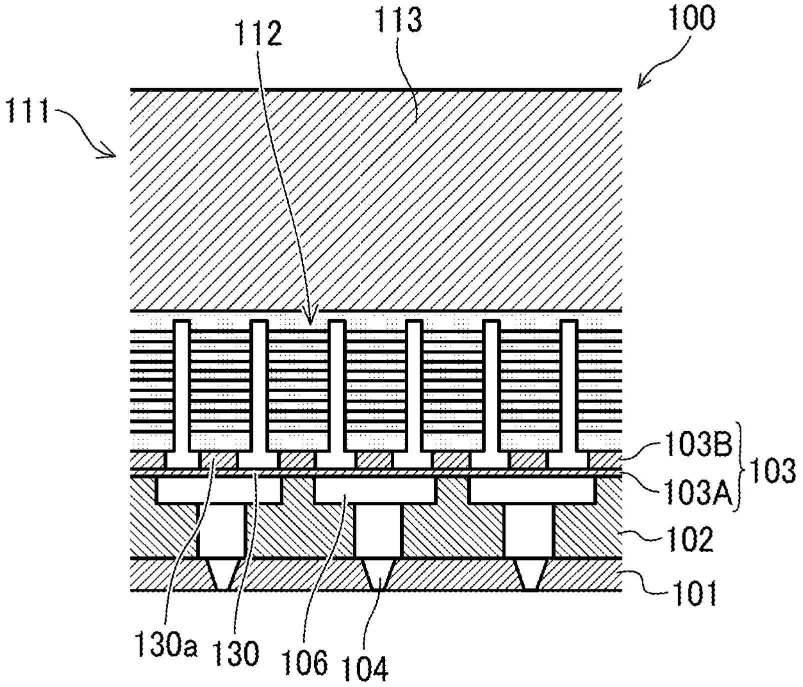
FIG. 4 is a cross-sectional view illustrating one example of the head along the nozzle arrangement direction.

Next, one example of the head 100 is described with reference to FIGS. 3 and 4. FIG. 3 is a cross-sectional view of the head 100 in a direction perpendicular to a nozzle arrangement direction, and FIG. 4 is a cross-sectional view of the head 100 along the nozzle arrangement direction.

The liquid discharge head 100 according to the present embodiment includes a nozzle plate 101, a channel plate 102 as an individual channel member, and a diaphragm member 103 as a wall member. The nozzle plate 101, the channel plate 102, and the diaphragm member 103 are laminated and bonded. Moreover, the head 100 includes a piezoelectric actuator 111 and a common channel member 120. The piezoelectric actuator 111 displaces a diaphragm area 130 (diaphragm plate) of the diaphragm member 103, and the common channel member 120 doubles as a frame of the head 100.

The nozzle plate 101 has a plurality of nozzle rows in which the plurality of nozzles 104 which discharge liquid is arranged.

The channel plate 102 forms a plurality of pressure chambers 106, a plurality of individual supply channels 107 doubling as fluid-resistant portions, and an intermediate supply channel 108 as a liquid introduction portion. The pressure chambers 106 communicate with the plurality of nozzles 104, and the individual supply channels 107 respectively communicate with the pressure chambers 106. The intermediate supply channel 108 communicates with two or more individual supply channels 107.

The diaphragm member 103 includes a plurality of deformable diaphragm areas 130 (deformable diaphragms) that form walls of the pressure chambers 106 of the channel plate 102. Herein, the diaphragm member 103 has a two-layer structure (but is not limited to the two-layer structure), and includes a first layer 103A that is a thin portion and a second layer 103B that is a thick portion. The first layer 103A and the second layer 103B are arranged in order from a side at which the channel plate 102 is disposed.

The first layer 103A of the thin portion forms the deformable diaphragm area 130 in an area corresponding to the pressure chamber 106. Within the diaphragm area 130, the second layer 103B forms a projection portion 130*a* that is a thick portion to be bonded to the piezoelectric actuator 111.

The piezoelectric actuator 111 including an electromechanical conversion element as a drive unit (an actuator, a pressure generation element) that deforms the diaphragm area 130 of the diaphragm member 103 is disposed on the side opposite the pressure chamber 106 of the diaphragm member 103.

In the piezoelectric actuator 111, grooves that are processed by half-cut dicing on a piezoelectric member bonded to a base 113 are provided, and the desired number of columnar piezoelectric elements 112 is formed. The piezoelectric elements 112 are spaced a predetermined distance apart in a pectinate manner in a nozzle arrangement direction. The piezoelectric element 112 is alternately bonded to the projection portion 130*a* that is the thick portion formed on the diaphragm area 130 of the diaphragm member 103.

The piezoelectric element 112 includes piezoelectric layers and internal electrodes that are alternately laminated. Each of the internal electrodes is pulled out to an edge surface and connected to an external electrode (an edge surface electrode), and a flexible wiring 115 is connected to the external electrode.

The common channel member 120 forms a common supply channel 110. The common supply channel 110 communicates with the intermediate supply channel 108 as a liquid introduction portion via an opening 109 doubling as a filter disposed in the diaphragm member 103, and leads to the individual supply channel 107 via the intermediate supply channel 108.

In the liquid discharge head 100, for example, a voltage to be applied to the piezoelectric element 112 is decreased from a reference potential (an intermediate potential), so that the piezoelectric element 112 contracts. Such contraction of the piezoelectric element 112 pulls the diaphragm area 130 of the diaphragm member 103, and volume of the pressure chamber 106 is expanded. Thus, liquid flows into the pressure chamber 106.

Subsequently, a voltage to be applied to the piezoelectric element 112 is increased to stretch the piezoelectric element 112 in a lamination direction, and the diaphragm area 130 of the diaphragm member 103 is deformed in a direction toward the nozzle 104 to reduce the volume of the pressure chamber 106, so that the liquid inside the pressure chamber 106 is pressurized. Thus, the liquid is discharged from the nozzle 104.

Figure 5:
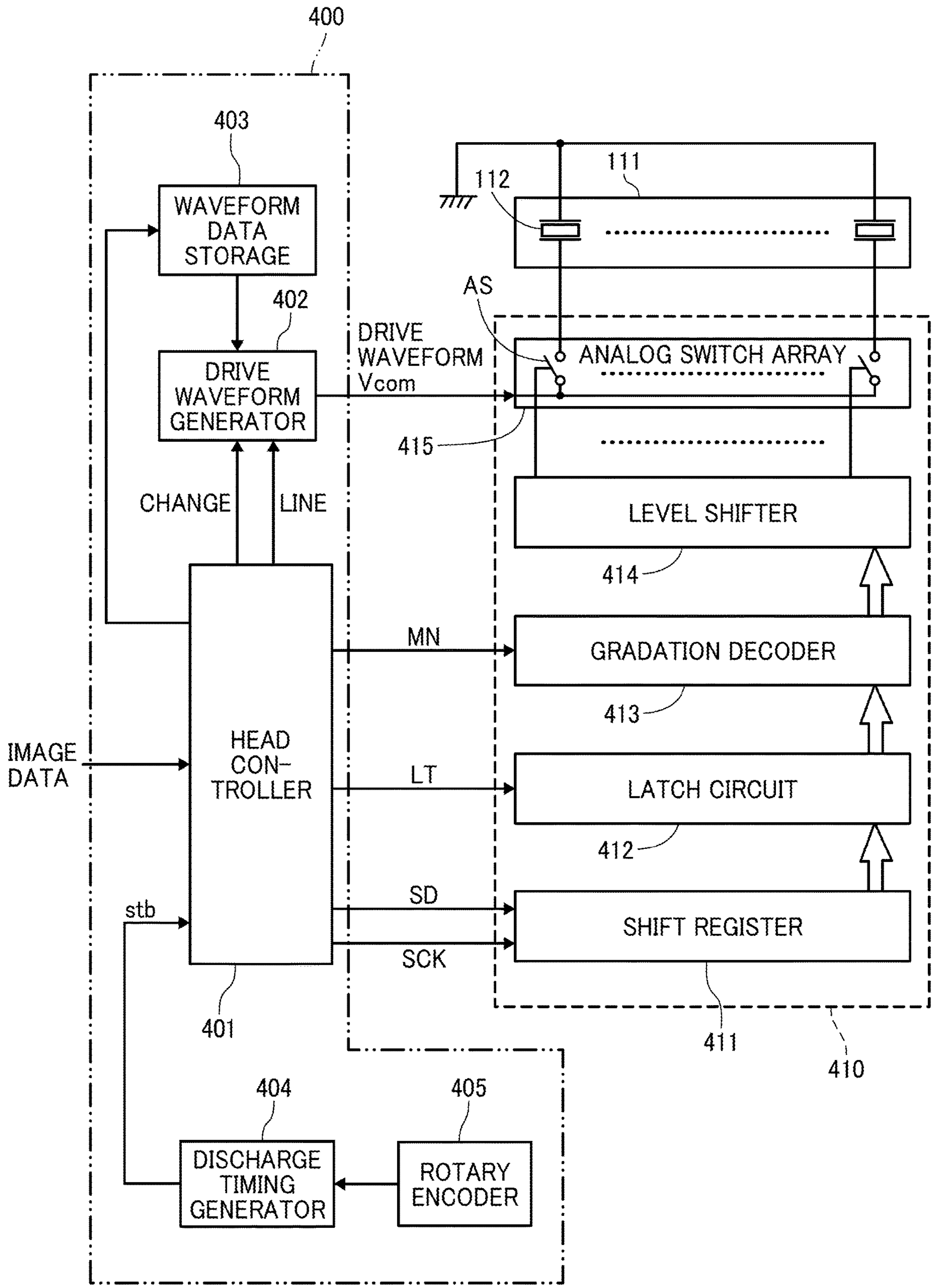
FIG. 5 is a block diagram illustrating a configuration including a head drive controller of the printing apparatus.

Next, a configuration including a head drive controller 400 for driving the head 100 is described with reference to a block diagram of FIG. 5.

The head drive controller 400 which provides a drive waveform to the head 100 includes a head controller 401, a drive waveform generator 402, a waveform data storage 403, a head driver 410, and a discharge timing generator 404. The drive waveform generator 402 and the waveform data storage 403 form a drive waveform generation device as a drive waveform generator according to the present embodiment. The discharge timing generator 404 generates discharge timing.

Upon receipt of a discharge timing pulse stb, the head controller 401 outputs a discharge synchronization signal LINE that triggers generation of a drive waveform to the drive waveform generator 402. In addition, the head controller 401 outputs a discharge timing signal CHANGE that corresponds to an amount of delay from the discharge synchronization signal LINE to the drive waveform generator 402.

The drive waveform generator 402 generates a common drive waveform Vcom at a time based on the discharge synchronization signal LINE and the discharge timing signal CHANGE.

The head controller 401 receives image data and generates, based on the received image data, a mask control signal MN for selection of a predetermined waveform of the common drive waveform signal Vcom according to size of liquid to be discharged from each nozzle 104 of the head 100. The mask control signal MN is a timing signal synchronized with the discharge timing signal CHANGE.

The head controller 401 transfers image data SD, a synchronization clock signal SCK, a latch signal LT instructing latch of the image data, and the generated selection signal MN to the head driver 410.

The head driver 410 includes a shift register 411, a latch circuit 412, a gradation decoder 413, a level shifter 414, and an analog switch array 415.

The shift register 411 receives the image data SD and the synchronization clock signal SCK transferred from the head controller 401. The latch circuit 412 latches each register value of the shift register 411 according to the latch signal LT transferred from the head controller 401.

The gradation decoder 413 decodes the value (the image data SD) latched by the latch circuit 412 and the mask control signal MN, and outputs a result of the decoding. The level shifter 414 converts a level of a logic level voltage signal of the gradation decoder 413 into a level at which an analog switch AS of the analog switch array 415 is operatable.

The analog switch AS of the analog switch array 415 is a switch that is turned on and off according to an output of the gradation decoder 413 supplied via the level shifter 414. Such an analog switch AS is disposed for each nozzle 104 of the head 100, and is connected to an individual electrode of the piezoelectric element 112 corresponding to each nozzle 104. The common drive waveform signal Vcom from the drive waveform generator 402 is input to the analog switch AS. As described above, a timing of the mask control signal MN is synchronized with a timing of the common drive waveform Vcom.

Thus, the analog switch AS is turned on and off at an appropriate time according to the output provided from the gradation decoder 413 via the level shifter 414, so that a drive pulse to be applied to the piezoelectric element 112 corresponding to each nozzle 104 is selected from drive pulses of the common drive waveform signal Vcom. As a result, size of droplet to be discharged from the nozzle 104 is controlled.

The discharge timing generator 404 generates, based on a detection result provided by a rotary encoder 405 that detects a rotation amount of the drum 31, a discharge timing pulse stb every time a sheet P is moved by a predetermined amount, and outputs the generated discharge timing pulse stb. The rotary encoder 405 includes an encoder wheel that rotates with the drum 31, and an encoder sensor that reads a slit of the encoder wheel.

Figure 6:
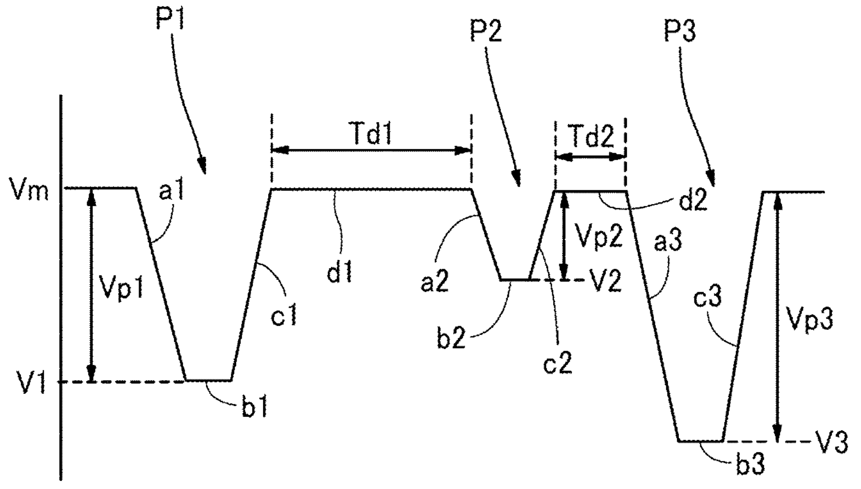
FIG. 6 is a diagram illustrating a drive waveform according to the embodiment.

Next, a drive waveform according to the present embodiment is described with reference to FIG. 6.

A drive waveform Va of the present embodiment includes a first drive pulse P1, a second drive pulse P2, and a third drive pulse P3 as a plurality of drive pulses. The first, second, and third drive pulses P1, P2, and P3 are successively included in time series.

The first drive pulse P1 is a first discharge pulse that causes liquid in the pressure chamber 106 to be pressurized to discharge the liquid. The first drive pulse P1 includes an expansion waveform element a1, a holding waveform element b1, and a contraction waveform element c1. The expansion waveform element a1 causes the pressure chamber 106 to expand, and the holding waveform element b1 causes a state of the pressure chamber 106 which has expanded in response to the expansion waveform element a1 to be held. The contraction waveform element c1 causes the pressure chamber 106 to contract from the state held by the holding waveform element b1 to discharge liquid.

The expansion waveform element a1 of the first drive pulse P1 is a waveform falling from an intermediate potential (or a reference potential) Vm to a potential V1. The holding waveform element b1 is a waveform for holding the potential V1. The contraction waveform element c1 is a waveform rising from the potential V1 to the intermediate potential Vm. The first drive pulse P1 is set to have a wave height value Vp1.

The second drive pulse P2 is a non-discharge pulse that can be used as a micro drive waveform that causes liquid in the pressure chamber 106 to be pressurized to the extent at which meniscus vibrates without discharge of liquid. The second drive pulse P2 includes an expansion waveform element a2, a holding waveform element b2, and a holding waveform element b3. The expansion waveform element a2 causes the pressure chamber 106 to expand, and the holding waveform element b2 causes a state of the pressure chamber 106 which has expanded in response to the expansion waveform element a2 to be held. The contraction waveform element c2 causes the pressure chamber 106 to contract from the state held by the holding waveform element b2 to vibrate the meniscus.

The expansion waveform element a2 of the second drive pulse P2 is a waveform falling from an intermediate potential (or a reference potential) Vm to a potential V2 (V2<V1). The holding waveform element b2 is a waveform for holding the potential V2, and the contraction waveform element c2 is a waveform rising from the potential V2 to the intermediate potential Vm. The second drive pulse P2 is set to have a wave height value Vp2.

The third drive pulse P3 is a second discharge pulse that causes liquid in the pressure chamber 106 to be pressurized to discharge the liquid. The third drive pulse P3 includes an expansion waveform element a3, a holding waveform element b3, and a contraction waveform element c3. The expansion waveform element a3 causes the pressure chamber 106 to expand, and the holding waveform element b3 causes a state of the pressure chamber 106 which has expanded in response to the expansion waveform element a3 to be held. The contraction waveform element c3 causes the pressure chamber 106 to contract from the state held by the holding waveform element b3 to discharge liquid.

The expansion waveform element a3 of the third drive pulse P3 is a waveform falling from an intermediate potential (or a reference potential) Vm to a potential V3 (V3>V1). The holding waveform element b3 is a waveform for holding the potential V3. The contraction waveform element c3 is a waveform rising from the potential V3 to the intermediate potential Vm. The third drive pulse P3 is set to have a wave height value Vp3.

A waveform from an end point of the contraction waveform element c1 of the first drive pulse P1 to a start point of the expansion waveform element a2 of the second drive pulse P2 is set as a pulse-to-pulse holding waveform element d1, and a time of the pulse-to pulse holding waveform element d1 is set to a time (a time interval between the first drive pulse P1 and the second drive pulse P2) Td1 (hereinafter, the time Td1 is also referred to as an interval Td1).

A waveform from an end point of the contraction waveform element c2 of the second drive pulse P2 to a start point of the expansion waveform element a3 of the third drive pulse P3 is set as a pulse-to-pulse holding waveform element d2, and a time of the pulse-to-pulse holding waveform element d2 is set to a time (a time interval between the second drive pulse P2 and the third drive pulse P3) Td2 (hereinafter, the time Td2 is also referred to as an interval Td2).

Herein, the interval (the time Td1) between the first drive pulse P1 and the second drive pulse P2 has a resonance relation. The resonance relation herein represents a relation in which residual vibration that occurs when liquid in the pressure chamber 106 is pressurized in response to the first drive pulse P1 amplifies a pressure to be applied when liquid in the pressure chamber 106 is pressurized in response to the second drive pulse P2.

Similarly, the interval (the time Td2) between the second drive pulse P2 and the third drive pulse P3 has a resonance relation. The resonance relation herein represents a relation in which residual vibration that occurs when liquid in the pressure chamber 106 is pressurized in response to the second drive pulse P2 amplifies a pressure to be applied when liquid in the pressure chamber 106 is pressurized in response to the third drive pulse P3.

In the present embodiment, the interval Td2 between the second drive pulse P2 and the third drive pulse P3 is within a range of Tc−(¼)Tc to Tc+(¼)Tc, where Tc is a resonance period (a natural vibration period) of the pressure chamber 106 of the head 100.

In addition, the wave height value Vp2 of the second drive pulse P2 is within a range of −10% to +10% of the peak wave height value Vpp2 by which a droplet speed Vj when the first drive pulse P1 is applied, the second drive pulse P2 is then applied, and the third drive pulse P3 is further applied to discharge liquid becomes a minimal value.

Accordingly, a satellite droplet generated from a droplet discharged in response to the third drive pulse P3 can be eliminated.

Hereinafter, an effect of the present embodiment is described in detail with reference to FIG. 7 and the following drawings.

Figure 7:
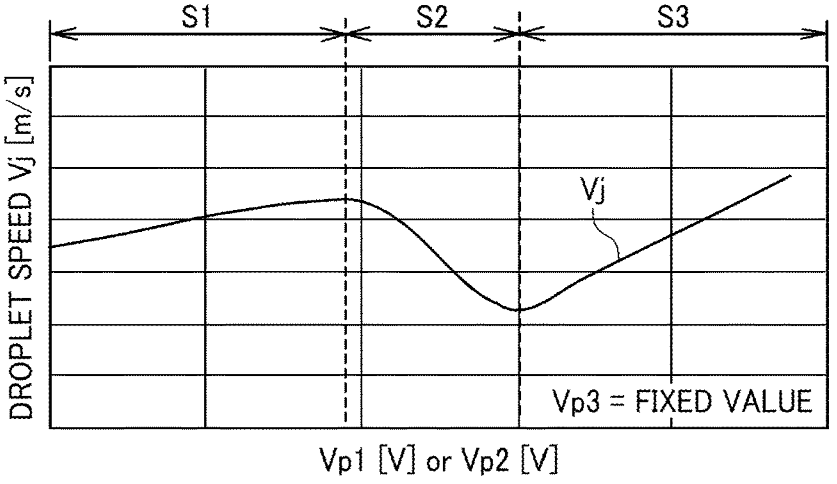
FIG. 7 is a diagram illustrating one example of a relation between a droplet speed and a wave height value of a first drive pulse or a second drive pulse according to the embodiment.

First, FIG. 7 illustrates one example of a change in droplet speed Vj when a wave height value Vp1 of the first drive pulse P1 or a wave height value Vp2 of the second drive pulse P2 is changed in a case in which a wave height value Vp3 of the third drive pulse P3 is a fixed value. The first drive pulse P1 and the second drive pulse P2 has a resonance timing relation, and the second drive pulse P2 and the third drive pulse P3 has a resonance timing relation.

Based on a result illustrated in FIG. 7, there can be broadly three ranges S1, S2, and S3 depending on a value of the wave height value Vp1 or Vp2.

That is, if the wave height value Vp1 of the first drive pulse P1 or the wave height value Vp2 of the second drive pulse P2 is within the range S1, the droplet speed Vj increases as the wave height value Vp1 increases.

If the wave height value Vp1 of the first drive pulse P1 or the wave height value Vp2 of the second drive pulse P2 is within the range S2, the droplet speed Vj decreases from a maximal value at a boundary between the range S1 and the range S2.

If the wave height value Vp1 of the first drive pulse P1 or the wave height value Vp2 of the wave height value Vp2 is within the range S3, the droplet speed Vj increases from a minimal value (the wave height value Vp1 or Vp2 herein is referred to as a peak wave height value Vpp1 or Vpp2, or simply referred to as a wave height value Vpp1 or Vpp2) at a boundary between the range S2 and the range S3.

Herein, the wave height value Vp1 of the first drive pulse P1 or the wave height value Vp2 of the second drive pulse P2 may be a voltage within a range of −10% to +10% of the peak wave height value Vpp1 or the peak wave height value Vpp2 by which the droplet speed Vj when the first drive pulse P1 is applied, the second drive pulse P2 is then applied, and the third drive pulse P3 is further applied to discharge liquid becomes a minimal value. In such a case, a satellite droplet speed significantly increases, and satellite is eliminated depending on a condition.

In other words, in the present embodiment as illustrated in FIG. 7, even if the wave height value Vp1 of the first drive pulse, instead of the second drive pulse P2, is a voltage within a range of −10% to +10% of the peak wave height value Vpp1 by which a droplet speed when a first drive pulse is applied, a second drive pulse is then applied, and a third drive pulse is further applied to discharge liquid becomes a minimal value, satellite is eliminated depending on a condition.

That is, a liquid discharge operation in response to the third drive pulse P3 receives discharge energy provided by the first drive pulse P1 or the second drive pulse P2, so that a satellite droplet speed significantly increases, and satellite is eliminated depending on a condition as described above. Thus, any of the first drive pulse P1 and the second drive pulse P2 can provide the discharge energy within a range of −10% to +10% of a wave height value by which the droplet speed Vj becomes a minimum value.

Figure 8:
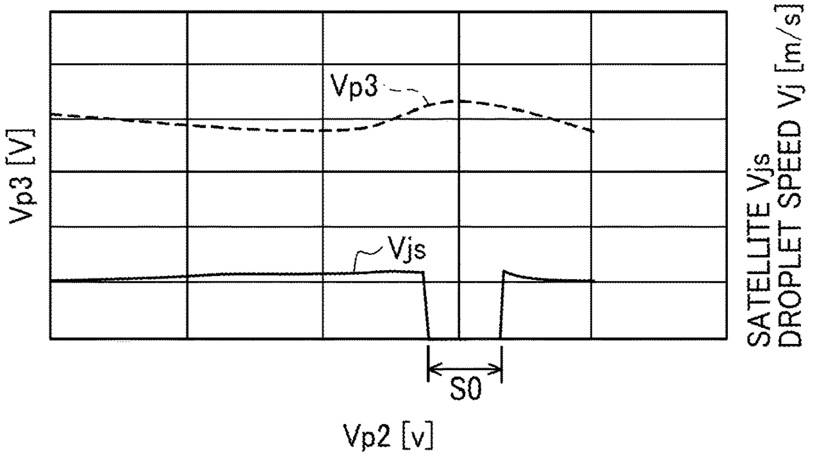
FIG. 8 is a diagram illustrating one example of a relation between a wave height value of a third drive pulse and a droplet speed of a satellite droplet with respect to a wave height value of a second drive pulse of a comparative example.

Herein, a disadvantage and satellite prevention in a pulse group including a second drive pulse P2 and a third drive pulse P3 without a first drive pulse P1 are described with reference to FIG. 8. FIG. 8 illustrate one example of a relation between a wave height value Vp3 of the third drive pulse P3 and a droplet speed of a satellite droplet when the wave height value Vp3 of the third drive pulse P3 is adjusted such that a droplet speed Vj becomes constant with respect to a wave height value Vp2 of the second drive pulse P2.

A satellite droplet sped Vjs slightly increases as the wave height value Vp2 of the second drive pulse P2 increases. However, there is an area (also referred to as a satellite-less area) S0 in which the satellite droplet sped Vjs is zero in the vicinity of the wave height value Vp2 of the second drive pulse P2 corresponding to the vicinity (near the boundary between ranges S2 and S3) in which the wave height value Vp3 of the third drive pulse P3 has a maximal value.

Such a satellite-less area is obtained in a case where an interval Td2 between the second drive pulse P2 and the third drive pulse P3 is the same as a resonance period Tc (i.e., Td=Tc).

A condition of the wave height value Vp2 to provide a satellite-less area is a voltage value that needs to be set near the boundary between the ranges S2 and S3. That is, a voltage near the boundary between the range S2 in which overflow of meniscus is likely to occur due to excessively large meniscus vibration by the second drive pulse P2 and the range S3 in which discharge of droplets begins by the second drive pulse P2 per se upon the overflow of the meniscus needs to be applied.

However, in the condition in which the meniscus vibration is excessively large, the second drive pulse P2 cannot be used as a micro drive waveform that is normally used to cause meniscus to vibrate to prevent dryness. The second drive pulse P2 having such a wave height value causes meniscus to move disorderly, and thus a next discharge droplet is affected. Consequently, discharge failure occurs, or a droplet is discharged due to the second drive pulse P2 (the micro drive waveform) per se. Hence, the second drive pulse P2 having such a wave height value no longer functions as micro driving.

Accordingly, a non-discharge pulse exclusively for satellite-less is necessary to satisfy both satellite-less and micro driving for prevention of meniscus dryness. That is, both a non-discharge pulse having a higher wave height value (a higher drive voltage) and a non-discharge pulse having a lower drive voltage as a micro drive waveform need to be set in a drive waveform. As a result, the drive waveform is lengthened, and a disadvantage in which a drive frequency cannot be increased occurs.

Next, one example of a relation between a wave height value Vp3 of the third drive pulse P3 and a satellite droplet sped Vjs with respect to an interval Td1 between a first drive pulse P1 and a second drive pulse P2 according to the present embodiment is described with reference to FIG. 9.

In this example, the first drive pulse P1 is a discharge pulse that causes a droplet to be discharged late and has a wave height value Vp1 that is set such that a droplet speed is approximately 5 m/s. The second drive pulse P2 is a non-discharge pulse having a low wave height value Vp2 usable as a micro drive waveform that causes meniscus to vibrate. In addition, an interval Td2 between the second drive pulse P2 and the third drive pulse P3 is resonance timing. The wave height value Vp2 is a voltage corresponding to a voltage within the range S1 described above.

The wave height value Vp3 of the third drive pulse P3 is adjusted using the interval Td1, between the first drive pulse P1 and the second drive pulse P2, as a parameter such that a merged droplet in response to the first drive pulse P1, the second drive pulse P2, and the third drive pulse P3 has a droplet speed of 7 m/s.

Figure 9:
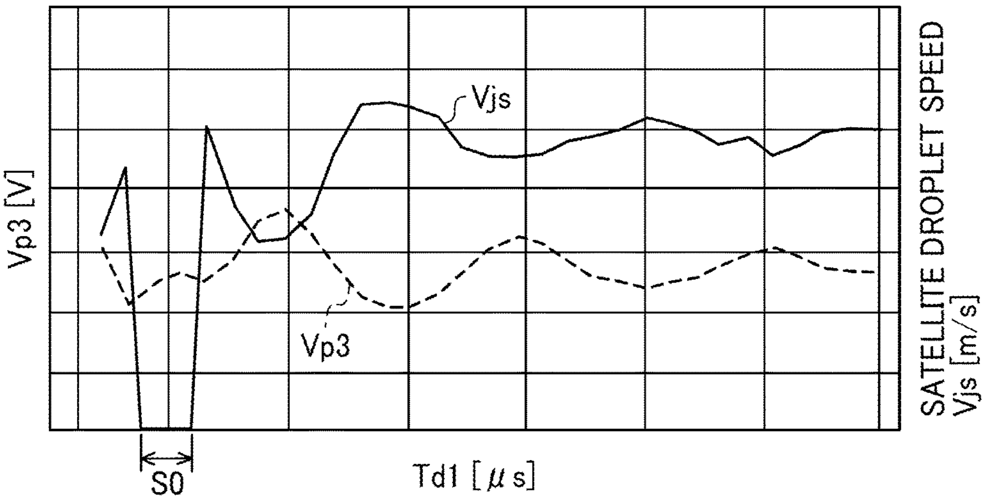
FIG. 9 is a diagram illustrating one example of changes in wave height value of the third drive pulse and droplet speed of a satellite droplet with respect to an interval between the first drive pulse and the second drive pulse according to the embodiment.

The satellite droplet sped Vjs and the wave height value Vp3 with respect to the interval Td1 herein are illustrated in FIG. 9.

As illustrated in FIG. 9, the wave height value Vp3 of the third drive pulse P3 periodically changes according to residual vibration by the first drive pulse P1 and the second drive pulse P2. However, at first resonance timing, that is, a time of the interval Td1 at which the wave height value Vp3 should be decreased, a voltage of the wave height value Vp3 seems to be slightly increased.

The satellite droplet sped Vjs also seems to change periodically according to the interval Td1. However, at first resonance timing, that is, when a voltage of the wave height value Vp3 is slightly increased, an area S0 in which satellite is eliminated is obtained.

As mentioned above, if the first drive pulse P1 is not used, an area in which satellite is eliminated or a satellite droplet speed is significantly increased is obtained when a voltage is increased to voltage limitation of whether to discharge liquid in response to the second 5 drive pulse P2 as a non-discharge pulse.

In the present embodiment, on the other hand, the first drive pulse P1 is arranged before the second drive pulse P2. Accordingly, when liquid is pressurized in response to the second drive pulse P2, meniscus vibration by the second drive pulse P2 is influenced by residual vibration by the first drive pulse P1.

Accordingly, even if the wave height value Vp2 of the second drive pulse P2 is a low voltage by which satellite is not eliminated or a satellite droplet speed is not significantly increased, the meniscus vibration by the second drive pulse P2 is amplified to vibration limitation of whether to discharge liquid. As a result, an area in which satellite is eliminated, or a satellite droplet speed is significantly increased is obtained.

Accordingly, the wave height value Vp2 of the second drive pulse P2 can be set to a lower voltage by which liquid is not discharged, so that the second drive pulse P2 can be used as a micro drive waveform that can cause meniscus to vibrate without discharge of liquid.

That is, a drive pulse for discharge is arranged before the micro drive pulse which causes meniscus to vibrate, so that vibration by the micro drive pulse can be amplified by residual vibration by the drive pulse, and the micro drive pulse can have a waveform strength (a wave height value) that is substantially the same as a waveform strength of a pulse for satellite prevention.

Accordingly, even if a plurality of droplets such as large droplets and middle droplets is provided, not only satellite-less is provided or a satellite droplet speed is significantly increased, but also a non-discharge pulse exclusively for satellite-less is not necessarily arranged. Thus, a drive waveform can be shortened, and high-frequency driving can be achieved.

Figure 10:
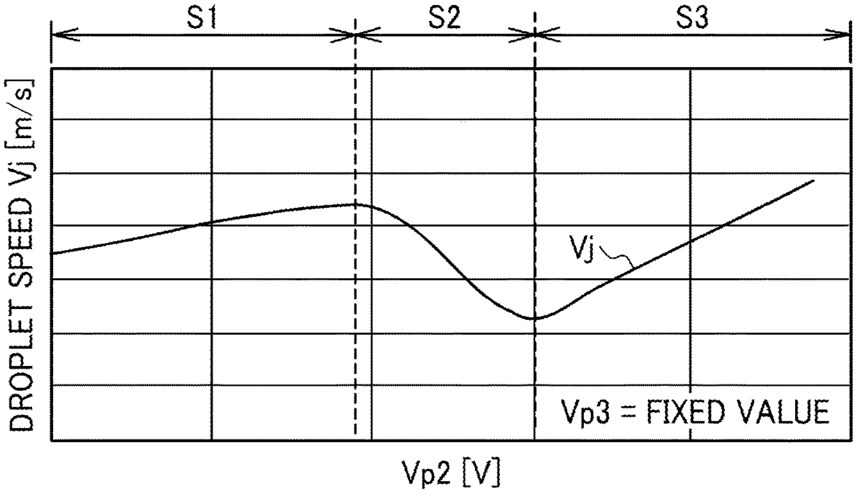
FIG. 10 is a diagram illustrating one example of a relation between a wave height value of the second drive pulse and a droplet speed according to the embodiment.

Next, a wave height value of the second drive pulse is described with reference to FIG. 10. FIG. 10 is a diagram illustrating one example of a change in droplet speed Vj when a wave height value Vp2 of the second drive pulse P2 is changed and a wave height value Vp3 of the third drive pulse P3 is fixed in a case of two pulses of the second drive pulse P2 and the third drive pulse P3.

As for a change in the droplet speed Vj, there can be broadly three ranges S1, S2, and S3 depending on a value of the wave height value Vp2.

Herein, the wave height value Vp2 in the range S3 is a voltage that is likely to be no longer a non-discharge pulse since a droplet tends to be discharged in response to the second drive pulse P2. Consequently, the second drive pulse P2 cannot be used as a micro drive waveform.

In addition, the wave height value Vp2 in the range S2 is a voltage that tends to rise the meniscus since meniscus rises in response to the second drive pulse P2 so that the vibration of the meniscus is not simple vibration. Consequently, the meniscus becomes difficult to be controlled, and non-discharge occurs in a case where the driving continues.

Accordingly, in a case where the second drive pulse P2 is used as a micro drive waveform (a micro drive pulse), the second drive pulse P2 is preferably set to a voltage having a wave height value Vp2 in the range S1. That is, a wave height value Vp2 in a case where the second drive pulse P2 is used as a micro drive waveform (a micro drive pulse) is preferably set to a voltage by which a droplet speed becomes lower than a maximal value of the droplet speed.

Next, a relation between an interval Td2 between a second drive pulse P2 and a third drive pulse P3 and satellite prevention is described with reference to FIGS. 11 to 14.

Herein, the interval Td2 between the second drive pulse P2 and the third drive pulse P3 is set to differ from a resonance period Tc, and a wave height value Vp3 of the third drive pulse P3 is adjusted such that a droplet speed is constant. Then, a change in satellite droplet with respect to a change in the second drive pulse P2 is evaluated.

Figure 11:
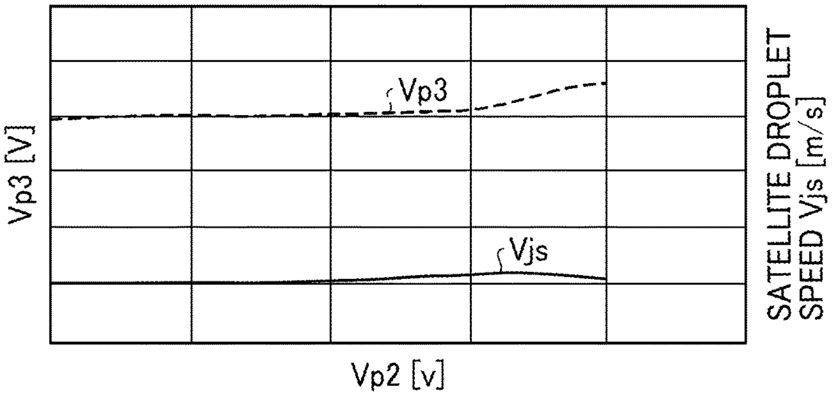
FIG. 11 is a diagram illustrating one example of changes in wave height value of the third drive pulse and droplet speed of a satellite droplet with respect to a wave height value of the second drive pulse according to the embodiment.

FIG. 11 illustrates a case where the interval Td2 between the second drive pulse P2 and the third drive pulse P3 is shortened by (2/5)Tc with respect to the resonance period Tc (i.e., a case where Td2=Tc−(2/5)Tc).

In such a condition, a condition for the wave height value Vp2 of the second drive pulse P2 which provides satellite-less is not found.

Figure 12:
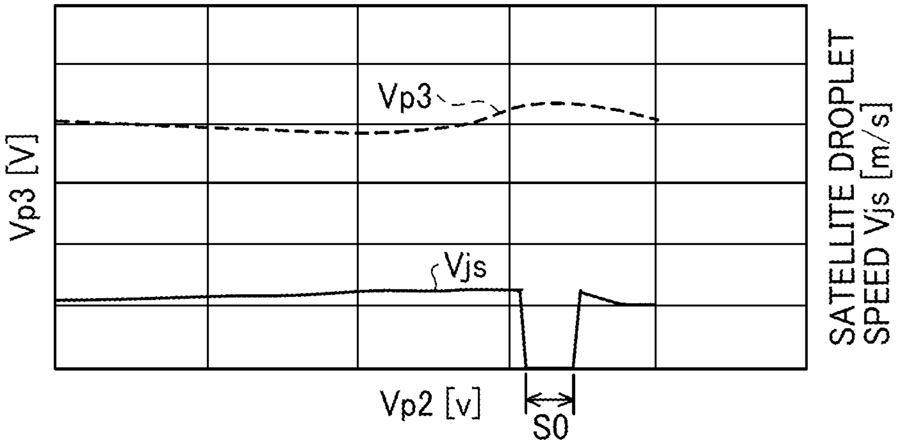
FIG. 12 is a diagram illustrating one example of changes in wave height value of the third drive pulse and droplet speed of a satellite droplet with respect to a wave height value of the second drive pulse according to the embodiment.

FIG. 12 illustrates a case where the interval Td2 between the second drive pulse P2 and the third drive pulse P3 is shortened by (1/4)Tc with respect to the resonance period Tc (i.e., a case where Td2=Tc−(1/4)Tc).

In such a condition, although a range of the wave height value Vp2 of the second drive pulse P2 is smaller than a range in a case where Td2=Tc, an area S0 that provides satellite-less is ascertained.

Figure 13:
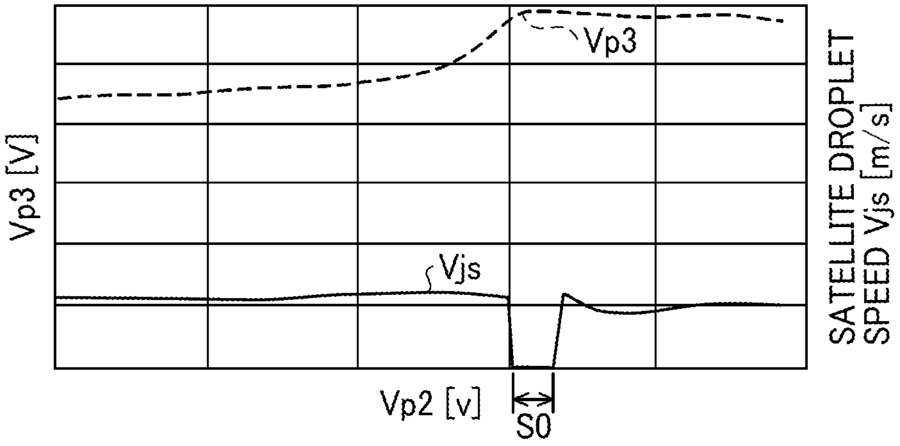
FIG. 13 is a diagram illustrating one example of changes in wave height value of the third drive pulse and droplet speed of a satellite droplet with respect to a wave height value of the second drive pulse according to the embodiment.

Next, FIG. 13 illustrates a case where the interval Td2 between the second drive pulse P2 and the third drive pulse P3 is lengthened by (1/3)Tc with respect to the resonance period Tc (i.e., a case where Td2=Tc+(1/3)Tc).

In such a condition, although a range of the wave height value Vp2 of the second drive pulse P2 is smaller than a range in a case where Td2=Tc, an area S0 that provides satellite-less is ascertained.

Figure 14:
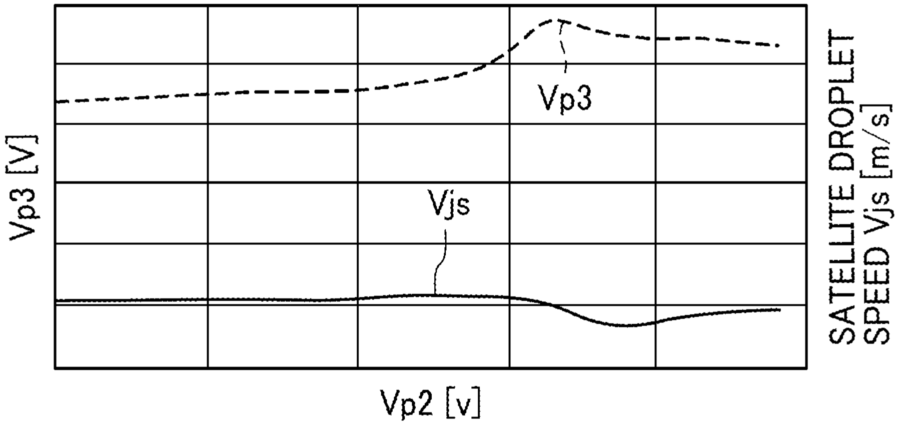
FIG. 14 is a diagram illustrating one example of changes in wave height value of the third drive pulse and droplet speed of a satellite droplet with respect to a wave height value of the second drive pulse according to the embodiment.

Next, FIG. 14 illustrates a case where the interval Td2 between the second drive pulse P2 and the third drive pulse P3 is lengthened by (1/2)Tc with respect to the resonance period Tc (i.e., a case where Td2=Tc+(1/2)Tc).

In such a condition, a condition for the wave height value Vp2 of the second drive pulse P2 which provides satellite-less is not found. In addition, even if the interval Td2 is set to be longer than (Tc+(½)Tc), a condition that provides satellite-less cannot be ascertained.

Based on such results, a relation between the interval Td2 between the second drive pulse P2 which can provide satellite-less and the third drive pulse P3 and the resonance period Tc, and the wave height value Vp2 of the second drive pulse P2 are described with reference to FIGS. 15 through 19.

FIG. 14 illustrates a maximum value and a minimum value of the wave height value Vp2 of the second drive pulse P2 which provides a satellite-less area S0, and a relation of voltage ratio between the maximum value and the minimum value.

Figure 15:
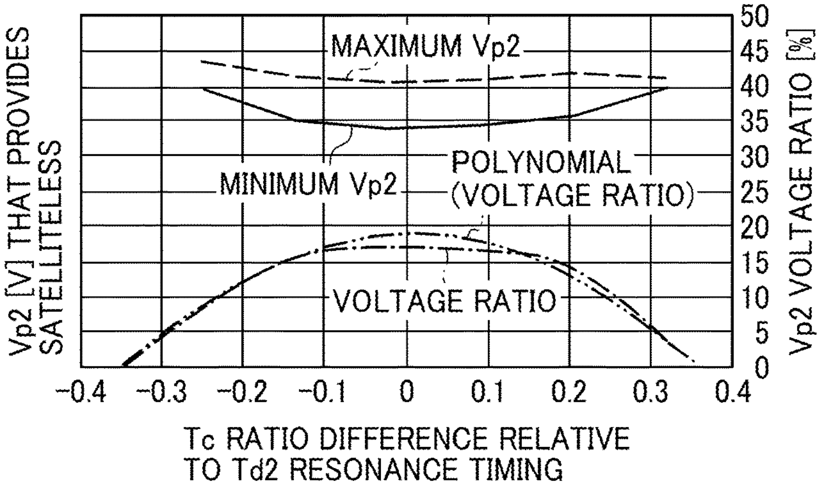
FIG. 15 is a diagram illustrating examples of a maximum wave height value and a minimum wave height value of a second drive pulse that causes satellite-less liquid discharge, and a relation of voltage ratio between the maximum wave height value and the minimum wave height value according to the embodiment.

In FIG. 15, a horizontal axis indicates a Tc ratio difference (Tc ratio conversion) relative to the resonance period Tc (resonance timing) of the interval Td2 between the second drive pulse P2 and the third drive pulse P3. For example, a Tc ratio difference of "0.1" represents an interval Td2 (Td2=Tc+0.1Tc) that is longer than an interval Td2 that is the same as the resonance period Tc by (0.1×Tc), and an evaluation result at the interval Td2 (Td2=Tc+0.1Tc) is illustrated.

Figure 16:
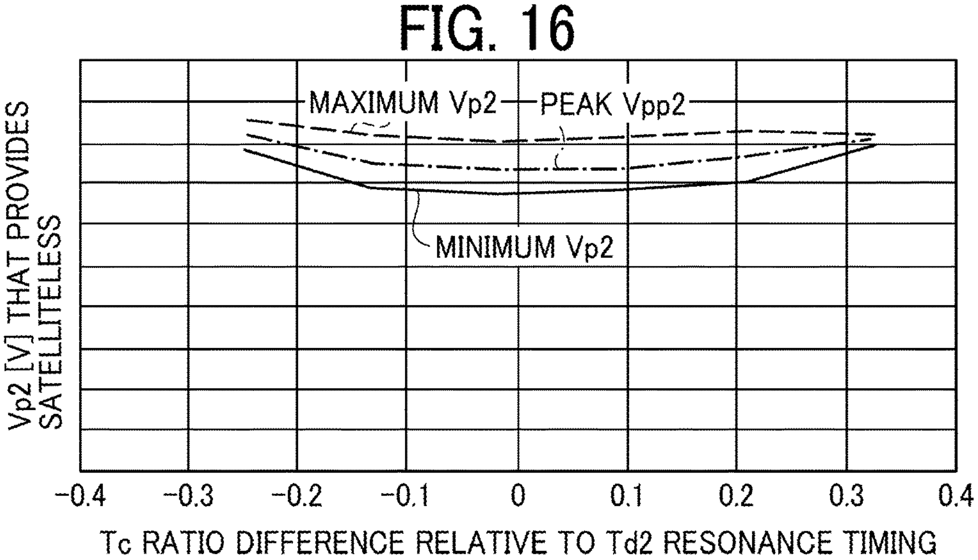
FIG. 16 is a diagram illustrating an interval Td2 that causes satellite-less liquid discharge and a wave height value of the second drive pulse according to the embodiment.

FIG. 16 illustrates a summary of a maximum value and a minimum value of the wave height value Vp2 of the second drive pulse P2 which provides satellite-less, and a value of the wave height value Vp2 (referred to as "a peak wave height value Vpp2") when the wave height value Vp3 of the third drive pulse P3 is peak (when a droplet speed of liquid discharged in response to the third drive pulse P3 is a minimal value).

Similar to FIG. 15, a horizontal axis of FIG. 16 indicates a Tc ratio difference (Tc ratio conversion) relative to the resonance period Tc (resonance timing) of the interval Td2 between the second drive pulse P2 and the third drive pulse P3. For example, a Tc ratio difference of "0.1" represents an interval Td2 (Td2=Tc+0.1Tc) that is longer than an interval Td2 that is the same as the resonance period Tc by (0.1×Tc), and an evaluation result at the interval Td2 (Td2=Tc+0.1Tc) is illustrated.

Figure 17:
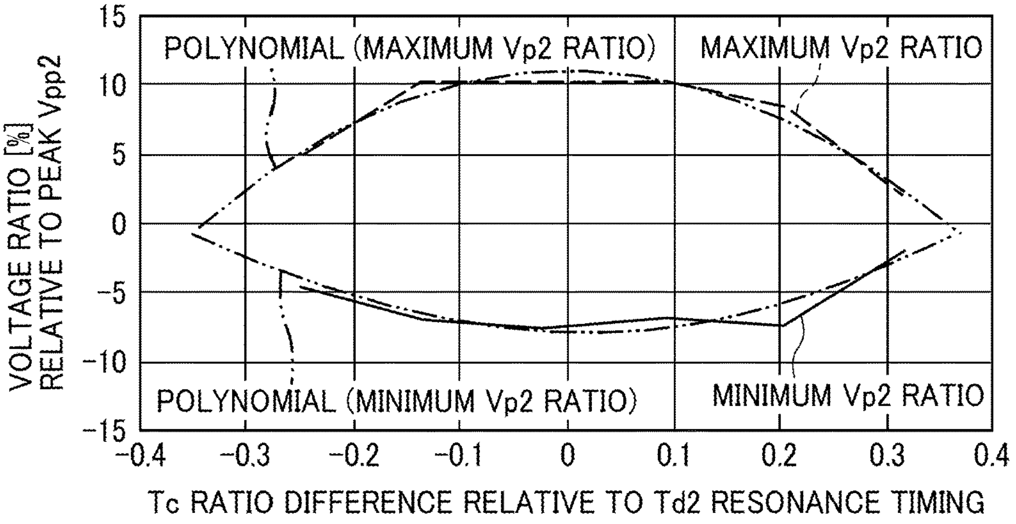
FIG. 17 is a diagram illustrating the interval Td2 which causes satellite-less liquid discharge and a wave height value of the second drive pulse according to the embodiment.
Figure 18:
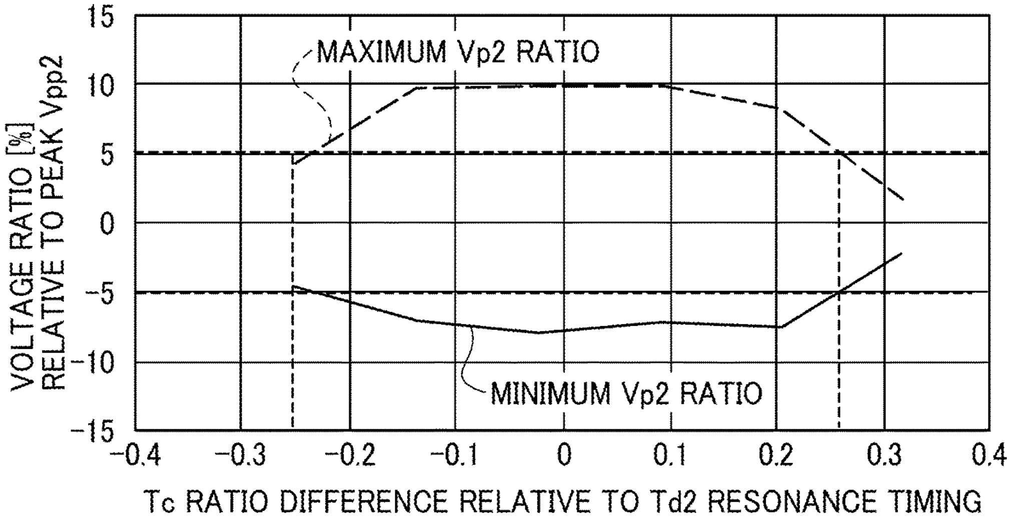
FIG. 18 is a diagram illustrating the interval Td2 which causes satellite-less liquid discharge and a wave height value of the second drive pulse according to the embodiment.
Figure 19:
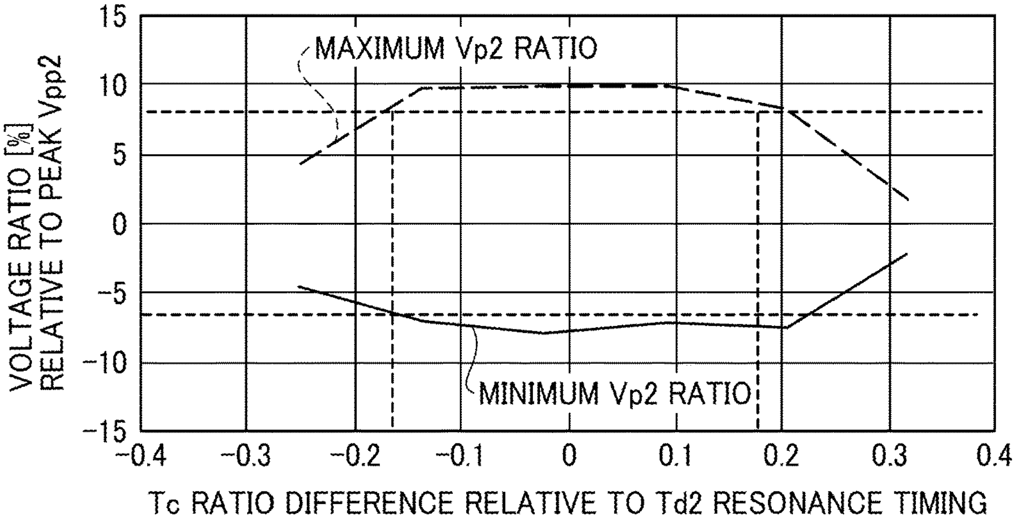
FIG. 19 is a diagram illustrating the interval Td2 which causes satellite-less liquid discharge and a wave height value of the second drive pulse according to the embodiment.

In each of FIGS. 17 through 19, a voltage range of a maximum value and a minimum value of the wave height value Vp2 (a voltage range of a maximum Vp2 and a minimum Vp2) of the second drive pulse P2 is expressed in a ratio of voltage difference relative to the peak wave height value Vpp2.

Similar to FIG. 16, a horizontal axis of each of FIGS. 17 through 19 indicates a Tc ratio difference (Tc ratio conversion) relative to a resonance period Tc (resonance timing) of the interval Td2 between the second drive pulse P2 and the third drive pulse P3. For example, a Tc ratio difference of "0.1" represents an interval Td2 (Td2=Tc+0.1Tc) that is longer than an interval Td2 that is the same as the resonance period Tc by (0.1×Tc), and an evaluation result at the interval Td2 (Td2=Tc+0.1Tc) is illustrated.

Therefore, in a case where the interval Td2 between the second drive pulse P2 and the third drive pulse P3 shifts relative to the resonance period Tc, a voltage range of the wave height value Vp2 of the second drive pulse P2 which can provide satellite-less becomes narrower.

Herein, the interval Td2 between the third drive pulse P2 which can provide satellite-less and the third drive pulse P3 is ±⅓Tc (within a range of Tc−(⅓)Tc to Tc+(⅓)Tc) relative to the resonance period Tc.

In addition, the second drive pulse P2 is within a range of "−10% to +10%" of the peak wave height value Vpp2 which is the wave height value Vp2 when a droplet speed Vj of liquid to be discharged in response to the third drive pulse P3 is a minimal value, that is when the wave height value Vp3 of the third drive pulse P3 is peak.

Herein, the interval Td2 between the second drive pulse P2 and the third drive pulse P3 is preferably within a range of Tc−(¼)Tc to Tc+(¼) Tc to obtain a voltage margin of Δ10% (±5%, that is, −5% to +5%) or more.

In addition, the interval Td2 between the second drive pulse P2 and the third drive pulse P3 is preferably within a range of Tc−(⅙)Tc to Tc+(⅙)Tc to obtain a voltage margin of Δ15% (±7.5%, that is, −7.5% to +7.5%) or more.

Moreover, the interval Td2 between the second drive pulse P2 and the third drive pulse P3 is set to the resonance period Tc (i.e., Td2=Tc), so that a voltage margin of Δ20% (±10.0%, that is, −10.0% to +10.0%) or more can be obtained.

Next, another embodiment is described with reference to FIGS. 20 through 22. Each of FIGS. 20 through 22 illustrates a relation between a resonance period Tc and an interval Td2 between a second drive pulse P2 that provides satellite-less and a third drive pulse P3, and a wave height value Vp2 of the second drive pulse P2 according to the present embodiment.

Figure 20:
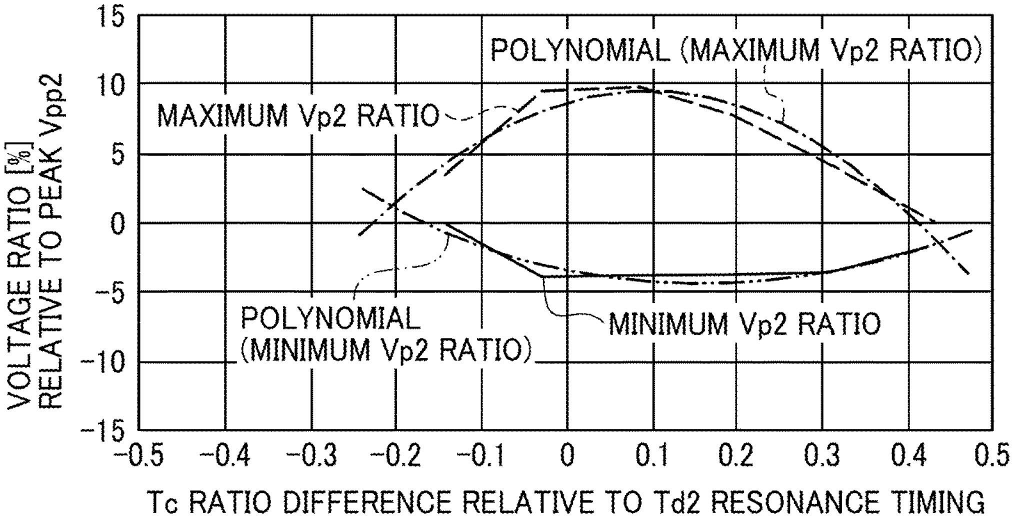
FIG. 20 is a diagram illustrating an interval Td2 that causes satellite-less liquid discharge and a wave height value of a second drive pulse according to another embodiment.
Figure 21:
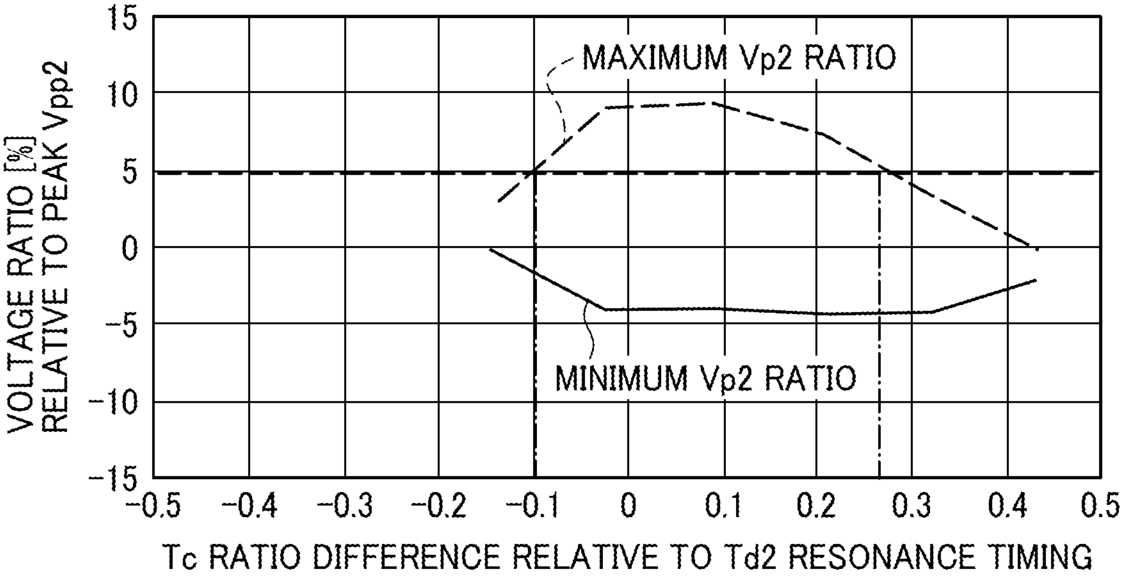
FIG. 21 is a diagram illustrating the interval Td2 which causes satellite-less liquid discharge and a wave height value of the second drive pulse according to the embodiment.
Figure 22:
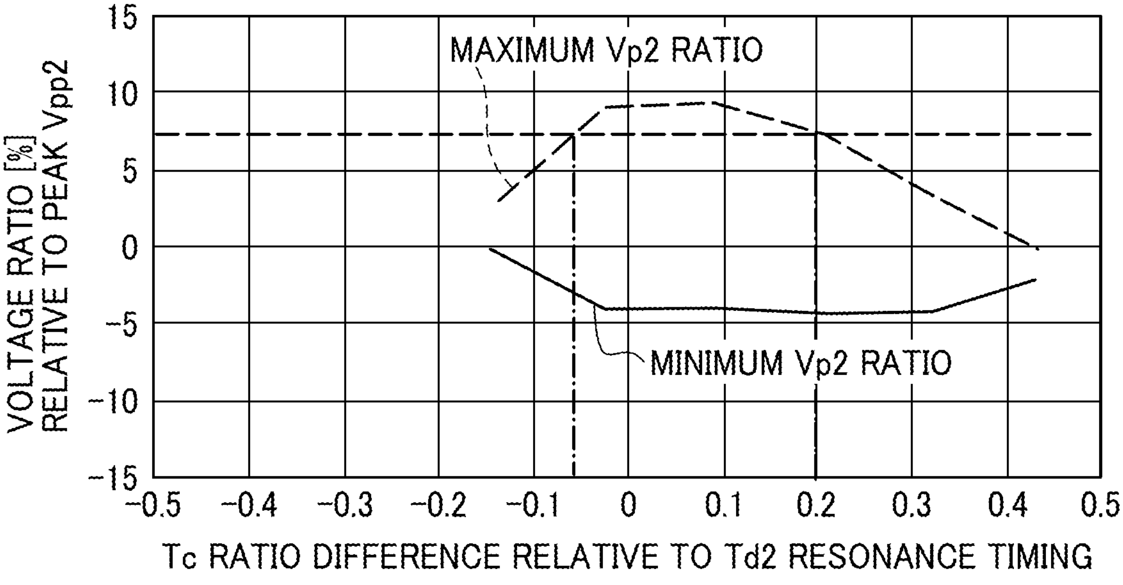
FIG. 22 is a diagram illustrating the interval Td2 which causes satellite-less liquid discharge and a wave height value of the second drive pulse according to the embodiment.

In each of FIGS. 20 through 22, a voltage range of a maximum value and a minimum value of the wave height value Vp2 (a voltage range of a maximum Vp2 and a minimum Vp2) of the second drive pulse P2 is expressed in a ratio of voltage difference relative to a peak wave height value Vpp2.

In each of FIGS. 20 through 22, a horizontal axis indicates a Tc ratio difference (Tc ratio conversion) relative to a resonance period Tc (resonance timing) of the interval Td2 between the second drive pulse P2 and the third drive pulse P3. For example, a Tc ratio difference of "0.1" represents an interval Td2 (Td2=Tc+0.1Tc) that is longer than an interval Td2 that is the same as the resonance period Tc by (0.1×Tc), and an evaluation result at the interval Td2 (Td2=Tc+0.1Tc) is illustrated.

In the present embodiment, the interval Td2 between the second drive pulse P2 which can provide satellite-less and the third drive pulse P3 is within a range of Tc−0.2Tc to Tc+0.45Tc, in other words, within a range of Tc−(⅕)Tc to Tc+(9/20)Tc.

Moreover, the second drive pulse P2 is within a range of −5% to +10% of the peak wave height value Vpp2 which is the wave height value Vp2 when a droplet speed Vj of liquid to be discharged in response to the third drive pulse P3 is a minimal value, that is, when the wave height value Vp3 of the third drive pulse P3 is peak.

Herein, based on FIG. 21, the interval Td2 between the second drive pulse P2 and the third drive pulse P3 is preferably within a range of Tc−0.1Tc to Tc+0.25Tc, in other words, within a range of Tc−(1/10)Tc to Tc+(¼)Tc to obtain a voltage margin of ±5% (−5% to +5%) or more.

Moreover, based on FIG. 22, the interval Td2 between the second drive pulse P2 and the third drive pulse P3 is preferably within a range of Tc−0.07Tc to Tc+0.2Tc, in other words, within a range of Tc−(1/14)Tc to Tc+(⅕)Tc to obtain a voltage margin of ±7.5% (−7.5% to +7.5%) or more.

Therefore, the drive waveform generator according to each of the embodiments generates a drive waveform Va that successively includes, in a time-series manner, a first drive pulse P1 that causes liquid to be discharged, a second drive pulse P2 that causes liquid not to be discharged, and a third drive pulse P3 that causes liquid to be discharged. The second drive pulse P2 can be used alone as a micro drive waveform that causes meniscus to vibrate to an extend that the liquid is not discharged. Each of an interval Td1 between the first drive pulse P1 and the second drive pulse P2, and an interval Td2 between the second drive pulse P2 and the third drive pulse P3 has a resonance relation. The wave height value Vp2 of the second drive pulse P2 is a voltage within a range of −10% to +10% of the peak wave height value Vpp2 by which a droplet speed Vj when the first drive pulse P1 is applied, the second drive pulse P2 is then applied, and the third drive pulse P3 is further applied to discharge liquid becomes a minimal value.

Moreover, in the drive waveform generator according to each of the embodiments, a first drive pulse P1 that causes liquid to be discharged, a second drive pulse P2 that causes liquid not to be discharged, and a third drive pulse P3 that causes liquid to be discharged are successively included in time series. The second drive pulse P2 can be used alone as a micro drive waveform that causes meniscus to vibrate to an extend that the liquid is not discharged. Each of an interval Td1 between the first drive pulse P1 and the second drive pulse P2, and an interval Td2 between the second drive pulse P2 and the third drive pulse P3 has a resonance relation. The wave height value Vp1 of the first drive pulse P1 can be a voltage within a range of −10% to +10% of the peak wave height value Vpp1 by which a droplet speed Vj when the first drive pulse P1 is applied, the second drive pulse P2 is then applied, and the third drive pulse P3 is further applied to discharge liquid becomes a minimal value.

In addition, a head driving method according to each of the embodiments generates a drive waveform Va, and applies the generated drive waveform Va to a liquid discharge head to discharge liquid. The drive wave form Va successively includes, in a time-series manner, a first drive pulse P1 that causes liquid to be discharged, a second drive pulse P2 that causes liquid not to be discharged, and a third drive pulse P3 that causes liquid to be discharged. The second drive pulse P2 can be used alone as a micro drive waveform that causes meniscus to vibrate to an extend that the liquid is not discharged. Each of an interval Td1 between the first drive pulse P1 and the second drive pulse P2, and an interval Td2 between the second drive pulse P2 and the third drive pulse P3 has a resonance relation. The wave height value Vp2 of the second drive pulse P2 is a voltage within a range of −10% to +10% of the peak wave height value Vpp2 by which a droplet speed Vj when the first drive pulse P1 is applied, the second drive pulse P2 is then applied, and the third drive pulse P3 is further applied to discharge liquid becomes a minimal value.

Moreover, a head driving method according to each of the embodiments can generate a drive waveform Va and apply the generated drive waveform Va to a liquid discharge head to discharge liquid. The drive wave form Va successively includes, in a time-series manner, a first drive pulse P1 that causes liquid to be discharged, a second drive pulse P2 that causes liquid not to be discharged, and a third drive pulse P3 that causes liquid to be discharged. The second drive pulse P2 can be used alone as a micro drive waveform that causes meniscus to vibrate to an extend that the liquid is not discharged. Each of an interval Td1 between the first drive pulse P1 and the second drive pulse P2, and an interval Td2 between the second drive pulse P2 and the third drive pulse P3 has a resonance relation. A wave height value Vp1 of the first drive pulse P1 is a voltage within a range of −10% to +10% of the peak wave height value Vpp1 by which a droplet speed Vj when the first drive pulse P1 is applied, the second drive pulse P2 is then applied, and the third drive pulse P3 is further applied to discharge liquid becomes a minimal value.

According to the present disclosure, liquid to be discharged is not particularly limited as long as the liquid has viscosity and surface tension with which the liquid can be discharged from the head. The liquid preferably has a viscosity of 30 mPa·s or less under ordinary temperature and ordinary pressure or by heating or cooling. Examples of the liquid include a solution, a suspension, and an emulsion. More particularly, examples of the solution, the suspension, or the emulsion include a solvent such as water and an organic solvent, a colorant such as dye and pigment, a functional material such as a polymerizable compound, a resin, and a surfactant, a biocompatible material such as DNA, amino acid, protein, and calcium, an edible material such as a natural colorant. Such a solution, a suspension, or an emulsion can be used for, for example, inkjet ink, a surface treatment solution, a solution for formation of components of an electronic element or a light-emitting element or formation of a resist pattern on an electronic circuit, and a material solution for three-dimensional fabrication.

Examples of energy sources for generating energy to discharge liquid include a piezoelectric actuator (e.g., a laminated piezoelectric element and a thin-film piezoelectric element), a thermal actuator that employs a thermoelectric conversion element such as a heat resistor, and an electrostatic actuator including a diaphragm and opposed electrodes.

In addition, examples of liquid discharge apparatuses include not only apparatuses that can discharge liquid to materials to which liquid can adhere, but also apparatuses that discharge a liquid toward gas or into a liquid.

Such a liquid discharge apparatus may include units that feed, convey, and eject a material to which liquid can adhere. The liquid discharge apparatus may further include a preprocessing device and a post-processing device.

For example, the liquid discharge apparatus may be an image forming apparatus that discharges ink to form an image on a sheet, or a three-dimensional fabrication apparatus that discharges fabrication liquid to a powder layer in which powder is formed in layers to form a three-dimensional fabrication object.

The liquid discharge apparatus is not limited to an apparatus that renders a meaningful image such as letters and figures visible with discharged liquid. For example, the discharge apparatus may be an apparatus that forms an image such as a pattern having no meaning, or fabricates a three-dimensional image.

The term "material to which liquid can adhere" used above represents a material to which liquid can at least temporarily adhere. Such a material includes a material to which liquid adheres and is then fixed, and a material to which liquid adheres and is then permeated. Particularly, examples of the materials on which liquid can adhere include a recording medium such as paper, recording paper, a recording sheet, a film, and cloth, an electronic component such as an electronic substrate and a piezoelectric element, and a medium such as a powder layer, an organ model, and a testing cell. The materials on which liquid can adhere includes any material to which liquid adheres, unless otherwise specified.

Examples of the materials to which liquid can adhere include any materials such as paper, thread, fiber, fabric, leather, metal, plastic, glass, wood, and ceramic to which liquid can adhere even temporarily.

Moreover, the liquid discharge apparatus can be an apparatus in which a liquid discharge head and a material to which liquid can adhere relatively move. However, the liquid discharge apparatus is not limited to such an apparatus. For example, the liquid discharge apparatus may be a serial apparatus that moves a liquid discharge head, and a line apparatus that does not move a liquid discharge head.

Examples of the liquid discharge apparatus further include a treatment liquid coating apparatus that discharges a treatment liquid to a sheet to coat a surface of the sheet with a treatment liquid to modify the sheet surface, and an injection granulation apparatus in which a composition liquid including raw materials dispersed in a solution is injected through nozzles to granulate fine particles of the raw materials.

The terms “image formation”, “recording”, “printing”, “image printing”, and “fabricating” used in the present disclosure may be used synonymously with each other.

According to each of the embodiments, a satellite prevention waveform and a micro drive waveform are compatible.

Aspect 1

A liquid discharge apparatus includes: a liquid discharge head (100) configured to discharge a liquid from a nozzle; a drive waveform generator configured to generate a drive waveform including multiple drive pulses to be applied to the liquid discharge head (100), the multiple drive pulses successively including: a first drive pulse (P1) configured to cause the liquid discharge head (100) to discharge the liquid; a second drive pulse (P2) configured to cause the liquid discharge head (100) not to discharged the liquid while causing meniscus of the liquid in the nozzle in the liquid discharge head (100) to vibrate; and a third drive pulse (P3) configured to cause the liquid discharge head (100) to discharge the liquid; in time series.

The drive waveform has: a first interval (Td1) between the first drive pulse (P1) and the second drive pulse (P2) at which the second drive pulse (P2) resonate with the first drive pulse (P1); and a second interval (Td2) between the second drive pulse (P2) and the third drive pulse (P3) at which the third drive pulse (P3) resonate with the second drive pulse (P2).

Aspect 2

In the liquid discharge apparatus according to Aspect 1, the first drive pulse (P1) has a first wave height value (Vp1) having a first voltage within a first range of −10% to +10% of a first peak wave height value (Vpp1) at which a first droplet speed of the liquid discharged by the liquid discharged head (100) becomes the minimal value when the first drive pulse, the second drive pulse, and the third drive pulse are successively applied to the liquid discharge head (100).

Aspect 3

In the liquid discharge apparatus according to Aspect 1, the second drive pulse (P2) has a second wave height value (Vp2) having a second voltage within a second range of −10% to +10% of a second peak wave height value (Vpp2) at which a second droplet speed of the liquid discharged by the liquid discharged head (100) becomes the minimal value when the first drive pulse, the second drive pulse, and the third drive pulse are successively applied to the liquid discharge head (100).

Aspect 4

In the liquid discharge apparatus according to Aspect 3, the second wave height value (Vp2) of the second drive pulse (P2) is lower than a third peak wave height value at which a droplet speed of the liquid discharged by the liquid discharged head (100) becomes the maximum value when the second drive pulse and the third drive pulse are successively applied to the liquid discharge head (100).

Aspect 5

In the liquid discharge apparatus according to Aspect 3, the second wave height value (Vp2) of the second drive pulse (P2) is within −7.5% to +7.5% of the second peak wave height value (Vpp2) at which a droplet speed of the liquid discharged by the liquid discharged head (100) becomes the minimum value when the third drive pulse is applied to the liquid discharge head (100).

Aspect 6

In the liquid discharge apparatus according to Aspect 3, the second wave height value (Vp2) of the second drive pulse (P2) is within −5.0% to +5.0% of the second wave height value (Vpp2) at which a droplet speed of the liquid discharged by the liquid discharged head (100) becomes the minimum value when the third drive pulse is applied to the liquid discharge head (100).

Aspect 7

In the liquid discharge apparatus according to Aspect 1, the liquid discharge head (100) includes a pressure chamber communicating with the nozzle, and the second drive pulse (P2) includes: an expansion waveform element to expand the pressure chamber to an expansion state; a holding waveform element to hold the expansion state of the pressure chamber; and a contraction waveform element to contract the pressure chamber from the expansion state held by the holding waveform element, and a holding time of the holding waveform element is shorter than a resonance period Tc of the pressure chamber of the liquid discharge head (100).

Aspect 8

In the liquid discharge apparatus according to claim 1, the drive waveform includes four or more drive pulses, and the first drive pulse, the second drive pulse, and the third drive pulse are the last pulse group in the four or more drive pulses.

Aspect 9

A waveform generator includes: a drive waveform generator configured to generate a drive waveform including multiple drive pulses to be applied to a liquid discharge head (100) to discharge a liquid from a nozzle, the multiple drive pulses successively including: a first drive pulse (P1) configured to cause the liquid discharge head (100) to discharge the liquid; a second drive pulse (P2) configured to cause the liquid discharge head (100) not to discharged the liquid while causing meniscus of the liquid in the nozzle in the liquid discharge head (100) to vibrate; and a third drive pulse (P3) configured to cause the liquid discharge head (100) to discharge the liquid; in time series. The drive waveform has: a first interval (Td1) between the first drive pulse (P1) and the second drive pulse (P2) at which the second drive pulse (P2) resonate with the first drive pulse (P1); and a second interval (Td2) between the second drive pulse (P2) and the third drive pulse (P3) at which the third drive pulse (P3) resonate with the second drive pulse (P2).

Aspect 10

In the waveform generator according to Aspect 9, the first drive pulse (P1) has a first wave height value (Vp1) having a first voltage within a first range of −10% to +10% of a first peak wave height value (Vpp1) at which a first droplet speed of the liquid discharged by the liquid discharged head (100) becomes the minimal value when the first drive pulse, the second drive pulse, and the third drive pulse are successively applied to the liquid discharge head (100).

Aspect 11

In the waveform generator according to Aspect 9, the second drive pulse (P2) has a second wave height value (Vp2) having a second voltage within a second range of −10% to +10% of a second peak wave height value (Vpp2) at which a second droplet speed of the liquid discharged by the liquid discharged head (100) becomes the minimal value when the first drive pulse, the second drive pulse, and the third drive pulse are successively applied to the liquid discharge head (100).

Aspect 12

A head driving method includes: generating a drive waveform including multiple drive pulses to be applied to a liquid discharge head (100) to discharge a liquid from a nozzle, applying the multiple drive pulses successively including: a first drive pulse (P1) configured to cause the liquid discharge head (100) to discharge the liquid; a second drive pulse (P2) configured to cause the liquid discharge head (100) not to discharged the liquid while causing meniscus of the liquid in the nozzle in the liquid discharge head (100) to vibrate; and a third drive pulse (P3) configured to cause the liquid discharge head (100) to discharge the liquid; in time series.

The drive waveform has: a first interval (Td1) between the first drive pulse (P1) and the second drive pulse (P2) at which the second drive pulse (P2) resonate with the first drive pulse (P1); and a second interval (Td2) between the second drive pulse (P2) and the third drive pulse (P3) at which the third drive pulse (P3) resonate with the second drive pulse (P2).

Aspect 13

In the head driving method according to Aspect 12, the first drive pulse (P1) has a first wave height value (Vp1) having a first voltage within a first range of −10% to +10% of a first peak wave height value (Vpp1) at which a first droplet speed of the liquid discharged by the liquid discharged head (100) becomes the minimal value when the first drive pulse (P1), the second drive pulse (P2), and the third drive pulse (P3) are successively applied to the liquid discharge head (100).

Aspect 14

In the head driving method according to Aspect 12, the second drive pulse (P2) has a second wave height value (Vp2) having a second voltage within a second range of −10% to +10% of a second peak wave height value (Vpp2) at which a second droplet speed of the liquid discharged by the liquid discharged head (100) becomes the minimal value when the first drive pulse, the second drive pulse (P2) and the third drive pulse (P3) are successively applied to the liquid discharge head (100).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein such as the head drive controller 400 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a liquid discharge head configured to discharge a liquid from a nozzle;

a drive waveform generator configured to generate a drive waveform including multiple drive pulses to be applied to the liquid discharge head, the multiple drive pulses successively including:

a first drive pulse configured to cause the liquid discharge head to discharge the liquid;

a second drive pulse configured to cause the liquid discharge head not to discharge the liquid while causing meniscus of the liquid in the nozzle in the liquid discharge head to vibrate; and a third drive pulse configured to cause the liquid discharge head to discharge the liquid;

in time series, wherein the drive waveform has:

a first interval between the first drive pulse and the second drive pulse at which the second drive pulse resonate with the first drive pulse; and a second interval between the second drive pulse and the third drive pulse at which the third drive pulse resonate with the second drive pulse, wherein the second drive pulse has a second wave height value having a second voltage within a second range of −10% to +10% of a second peak wave height value at which a second droplet speed of the liquid discharged by the liquid discharged head becomes the minimal value when the first drive pulse, the second drive pulse, and the third drive pulse are successively applied to the liquid discharge head.

2. The liquid discharge apparatus according to claim 1, wherein the first drive pulse has a first wave height value having a first voltage within a first range of −10% to +10% of a first peak wave height value at which a first droplet speed of the liquid discharged by the liquid discharged head becomes the minimal value when the first drive pulse, the second drive pulse, and the third drive pulse are successively applied to the liquid discharge head.

3. The liquid discharge apparatus according to claim 1, wherein the second wave height value of the second drive pulse is lower than a third peak wave height value at which a droplet speed of the liquid discharged by the liquid discharged head becomes the maximum value when the second drive pulse and the third drive pulse are successively applied to the liquid discharge head.

4. The liquid discharge apparatus according to claim 1, wherein the second wave height value of the second drive pulse is within −7.5% to +7.5% of the second peak wave height value at which a droplet speed of the liquid discharged by the liquid discharged head becomes the minimum value when the third drive pulse is applied to the liquid discharge head.

5. The liquid discharge apparatus according to claim 1, wherein the second wave height value of the second drive pulse is within −5.0% to +5.0% of the second wave height value at which a droplet speed of the liquid discharged by the liquid discharged head becomes the minimum value when the third drive pulse is applied to the liquid discharge head.

6. The liquid discharge apparatus according to claim 1, wherein the liquid discharge head includes a pressure chamber communicating with the nozzle, and the second drive pulse includes:

an expansion waveform element to expand the pressure chamber to an expansion state;

a holding waveform element to hold the expansion state of the pressure chamber; and a contraction waveform element to contract the pressure chamber from the expansion state held by the holding waveform element, and a holding time of the holding waveform element is shorter than a resonance period Tc of the pressure chamber of the liquid discharge head.

7. The liquid discharge apparatus according to claim 1, wherein the drive waveform includes four or more drive pulses, and the first drive pulse, the second drive pulse, and the third drive pulse are the last pulse group in the four or more drive pulses.

8. A waveform generator comprising:

a drive waveform generator configured to generate a drive waveform including multiple drive pulses to be applied to a liquid discharge head to discharge a liquid from a nozzle, the multiple drive pulses successively including:

a first drive pulse configured to cause the liquid discharge head to discharge the liquid;

a second drive pulse configured to cause the liquid discharge head not to discharge the liquid while causing meniscus of the liquid in the nozzle in the liquid discharge head to vibrate; and a third drive pulse configured to cause the liquid discharge head to discharge the liquid;

in time series, wherein the drive waveform has:

a first interval between the first drive pulse and the second drive pulse at which the second drive pulse resonate with the first drive pulse; and a second interval between the second drive pulse and the third drive pulse at which the third drive pulse resonate with the second drive pulse, wherein the second drive pulse has a second wave height value having a second voltage within a second range of −10% to +10% of a second peak wave height value at which a second droplet speed of the liquid discharged by the liquid discharged head becomes the minimal value when the first drive pulse, the second drive pulse, and the third drive pulse are successively applied to the liquid discharge head.

9. The waveform generator according to claim 8, wherein the first drive pulse has a first wave height value having a first voltage within a first range of −10% to +10% of a first peak wave height value at which a first droplet speed of the liquid discharged by the liquid discharged head becomes the minimal value when the first drive pulse, the second drive pulse, and the third drive pulse are successively applied to the liquid discharge head.

10. A head driving method comprising:

generating a drive waveform including multiple drive pulses to be applied to a liquid discharge head to discharge a liquid from a nozzle, applying the multiple drive pulses successively including:

a first drive pulse configured to cause the liquid discharge head to discharge the liquid;

a second drive pulse configured to cause the liquid discharge head not to discharge the liquid while causing meniscus of the liquid in the nozzle in the liquid discharge head to vibrate; and a third drive pulse configured to cause the liquid discharge head to discharge the liquid;

in time series, wherein the drive waveform has:

a first interval between the first drive pulse and the second drive pulse at which the second drive pulse resonate with the first drive pulse; and a second interval between the second drive pulse and the third drive pulse at which the third drive pulse resonate with the second drive pulse, wherein the second drive pulse has a second wave height value having a second voltage within a second range of −10% to +10% of a second peak wave height value at which a second droplet speed of the liquid discharged by the liquid discharged head becomes the minimal value when the first drive pulse, the second drive pulse, and the third drive pulse are successively applied to the liquid discharge head.

11. The head driving method according to claim 10, wherein the first drive pulse has a first wave height value having a first voltage within a first range of −10% to +10% of a first peak wave height value at which a first droplet speed of the liquid discharged by the liquid discharged head becomes the minimal value when the first drive pulse, the second drive pulse, and the third drive pulse are successively applied to the liquid discharge head.

* * * * *